(12) United States Patent
Elluin et al.

(10) Patent No.: US 11,629,611 B2
(45) Date of Patent: Apr. 18, 2023

(54) SEAL FOR AN INTERMEDIATE TURBOMACHINE CASING

(71) Applicant: SAFRAN AIRCRAFT ENGINES, Paris (FR)

(72) Inventors: Gonzague Marie Come Jacques André Elluin, Moissy Cramayel (FR); Damien Didier Clément Cordier, Moissy Cramayel (FR); Bruno Alexandre Didier Jacon, Moissy Cramayel (FR); Florian Benjamin Kévin Lacroix, Moissy Cramayel (FR); Philippe Didier Edmond Andre Liberal Nabias, Moissy Cramayel (FR); Julien Vitra, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/625,584

(22) PCT Filed: Jul. 2, 2020

(86) PCT No.: PCT/FR2020/051156
§ 371 (c)(1),
(2) Date: Jan. 7, 2022

(87) PCT Pub. No.: WO2021/009430
PCT Pub. Date: Jan. 21, 2021

(65) Prior Publication Data
US 2022/0282632 A1 Sep. 8, 2022

(30) Foreign Application Priority Data

Jul. 12, 2019 (FR) ...................................... 1907892

(51) Int. Cl.
*F01D 11/08* (2006.01)
*F01D 25/14* (2006.01)
*F01D 25/24* (2006.01)

(52) U.S. Cl.
CPC .............. *F01D 11/08* (2013.01); *F01D 25/14* (2013.01); *F01D 25/24* (2013.01)

(58) Field of Classification Search
CPC ........ F01D 11/005; F01D 11/08; F01D 25/14; F01D 25/24; F02C 6/08; F02C 7/28; F05D 2240/57; F05D 2250/75
See application file for complete search history.

(56) References Cited

U.S. PATENT DOCUMENTS 6,447,248 B1 * 9/2002 Kastl ..................... F01D 21/045
384/624
10,443,416 B2 * 10/2019 Hiernaux .................. F01D 9/04
(Continued)

FOREIGN PATENT DOCUMENTS

EP     1 035 377 A2    9/2000
FR     3 036 136 A1    11/2016
(Continued)

OTHER PUBLICATIONS

International Search Report as issued in International Patent Application No. PCT/FR2020/051156, dated Oct. 16, 2020.

*Primary Examiner* — Igor Kershteyn
(74) *Attorney, Agent, or Firm* — Pillsbury Winthrop Shaw Pittman LLP

(57) ABSTRACT

A discharge grille of an intermediate casing of a turbomachine includes a peripheral edge and a seal mounted on the peripheral edge via an attachment system, the seal ensuring the sealing between a first turbomachine member and a second member of the turbomachine, and surrounding the discharge grille of the intermediate casing, the seal having a U-shaped cross section and includes a base plate configured (Continued)

to bear against the first member, a sealing lip configured to bear against the second member through deformation of the sealing lip to ensure air tightness and fire proofing through contact.

13 Claims, 7 Drawing Sheets

(56) References Cited

U.S. PATENT DOCUMENTS

2018/0266263 A1* 9/2018 Jacon ................... F16J 15/4476
2018/0266276 A1* 9/2018 Phillips ................. F01D 25/164
2018/0291841 A1* 10/2018 Lacroix ................. F04D 27/023

FOREIGN PATENT DOCUMENTS

FR 3 064 029 A1 9/2018
WO WO 2004/005002 A1 1/2004

* cited by examiner

[Fig. 1]
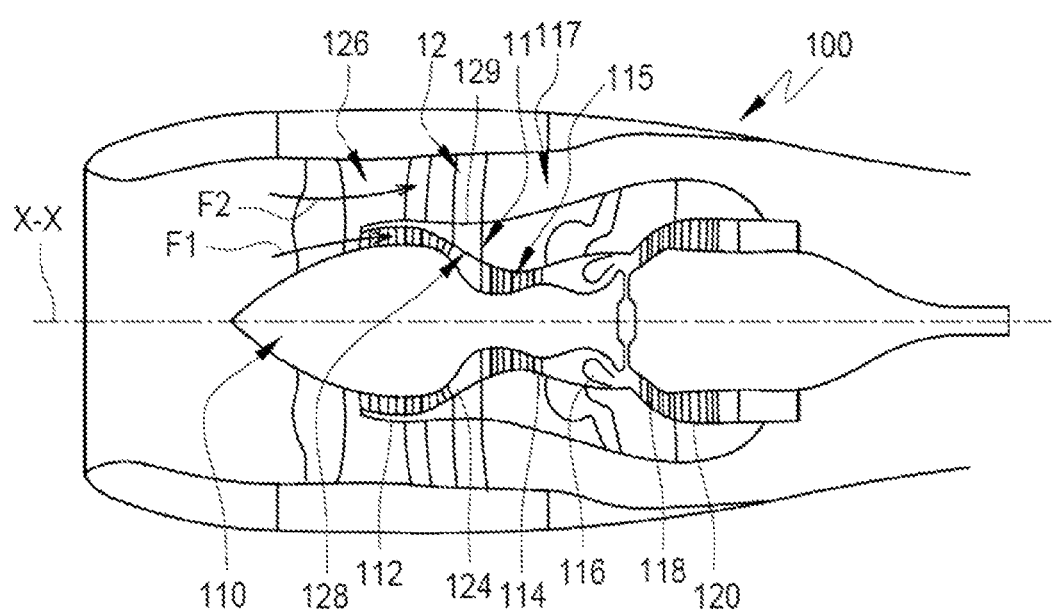

[Fig. 2]
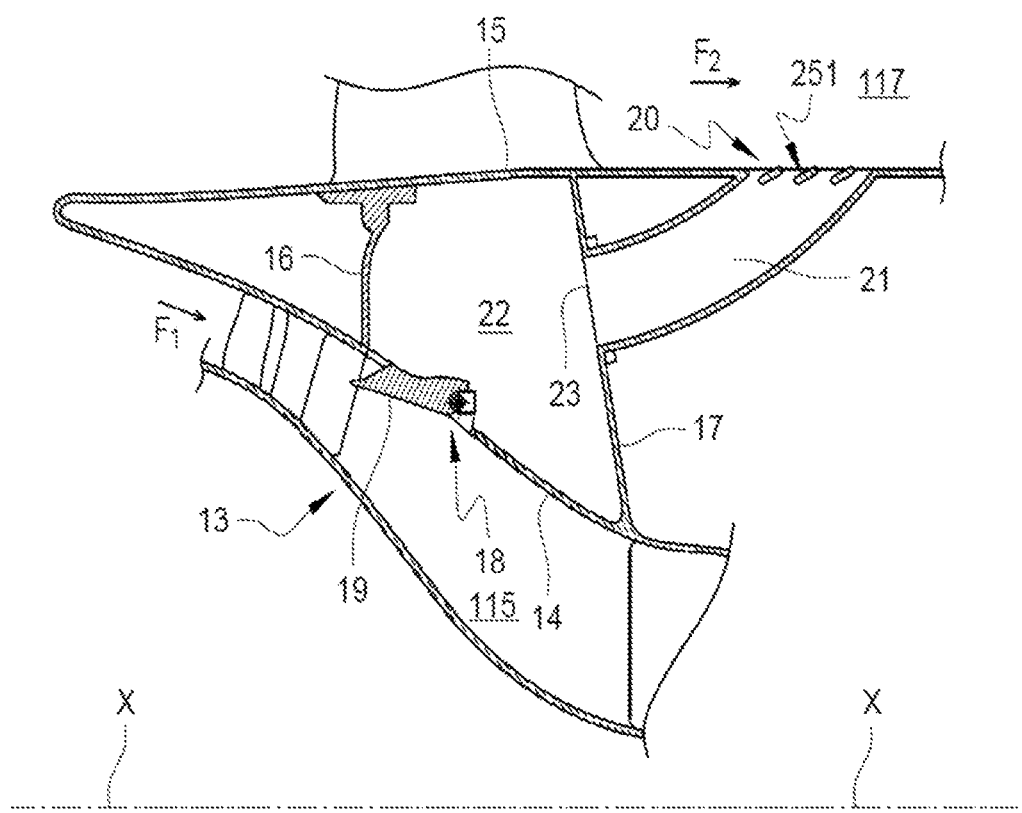

[Fig. 3a]
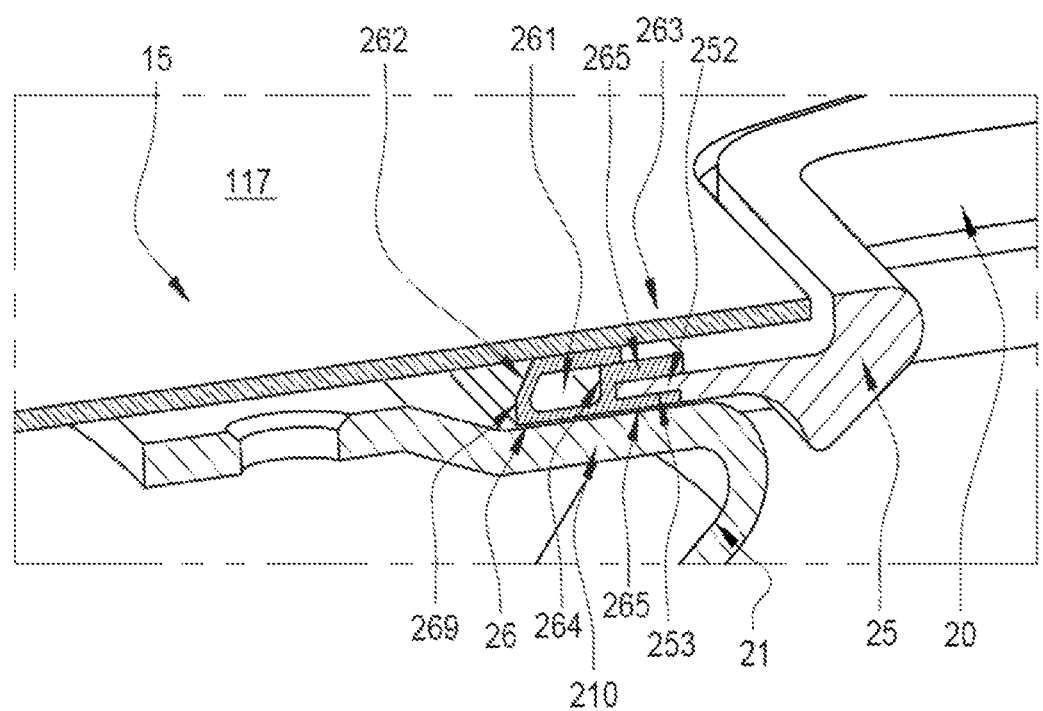

[Fig. 3b]
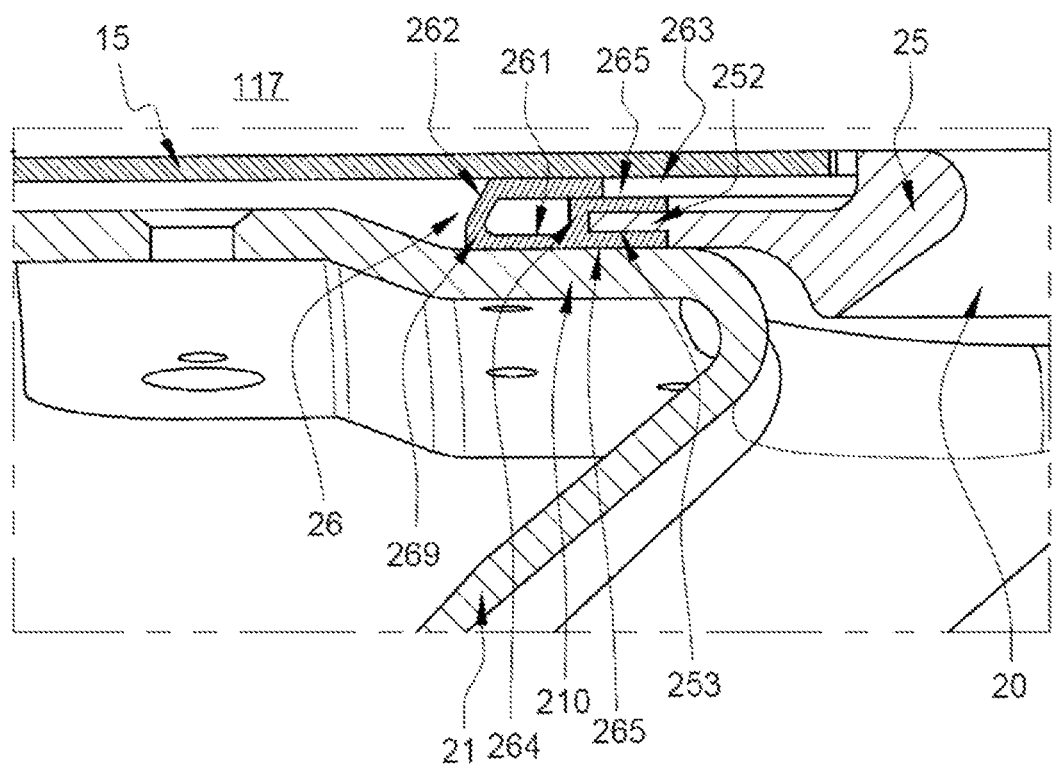

[Fig. 4a]
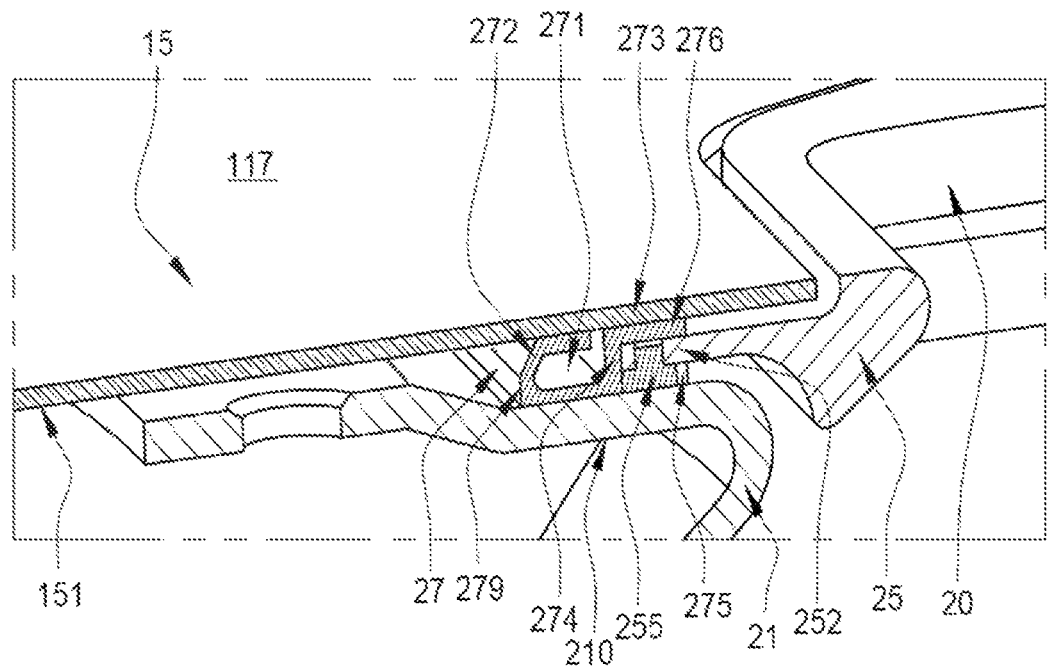
[Fig. 4b]
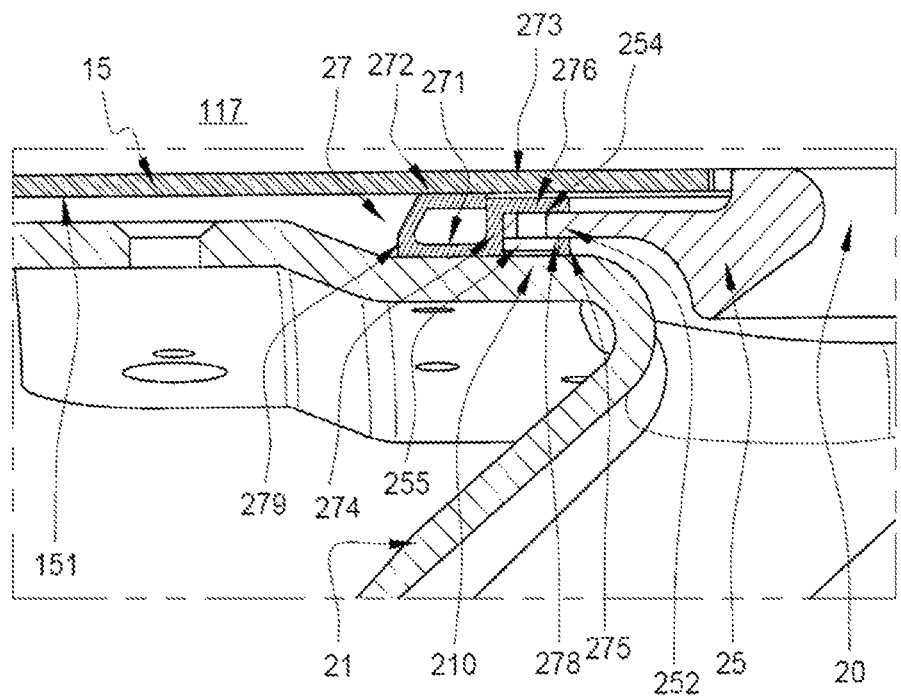

[Fig. 5a]
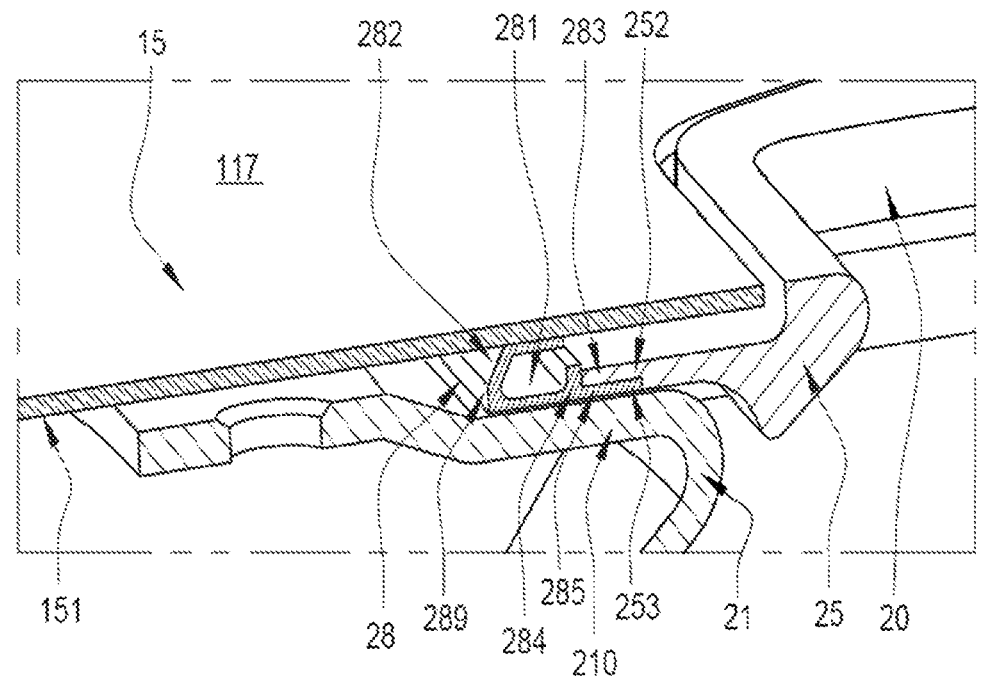
[Fig. 5b]
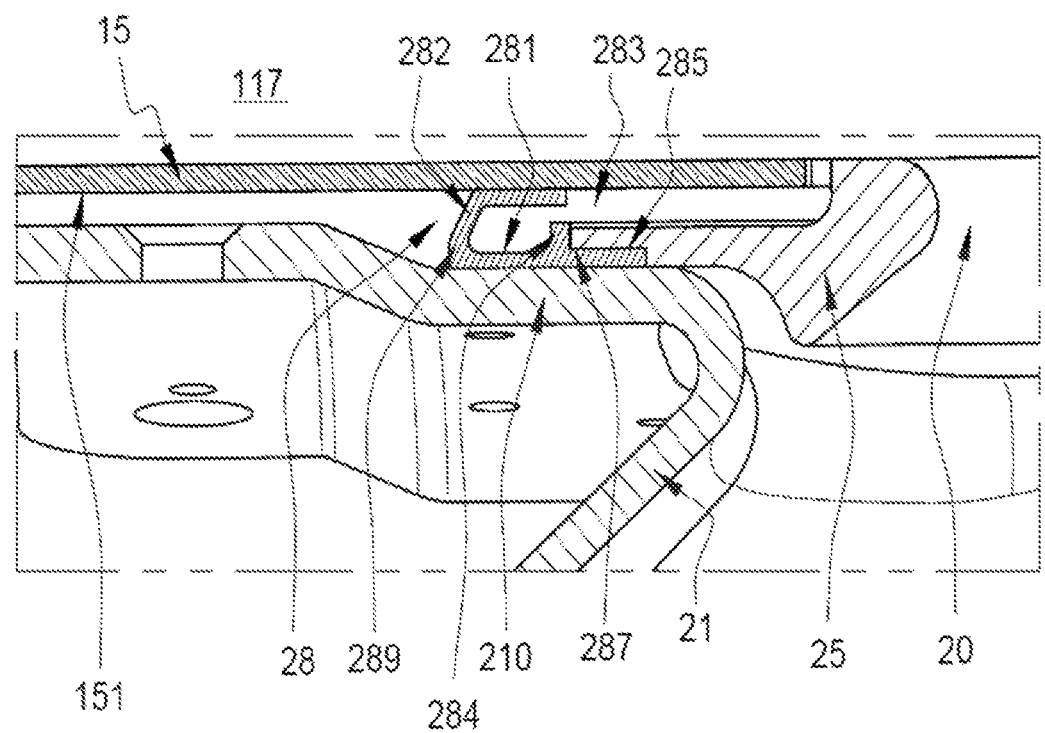

[Fig. 6a]
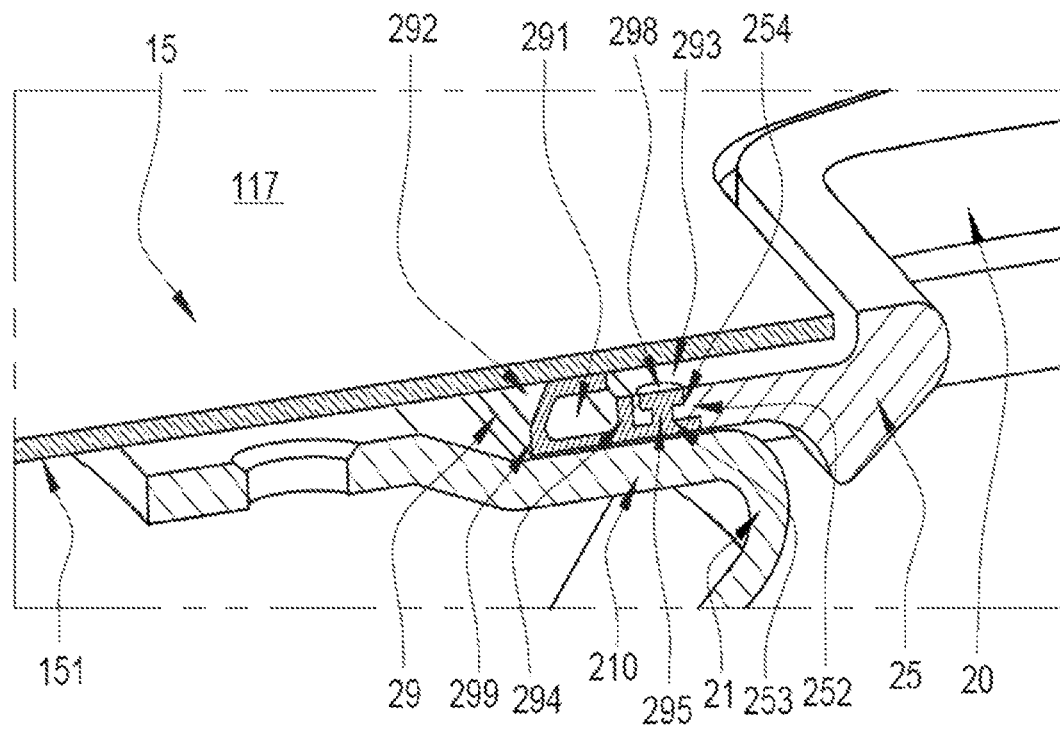
[Fig. 6b]
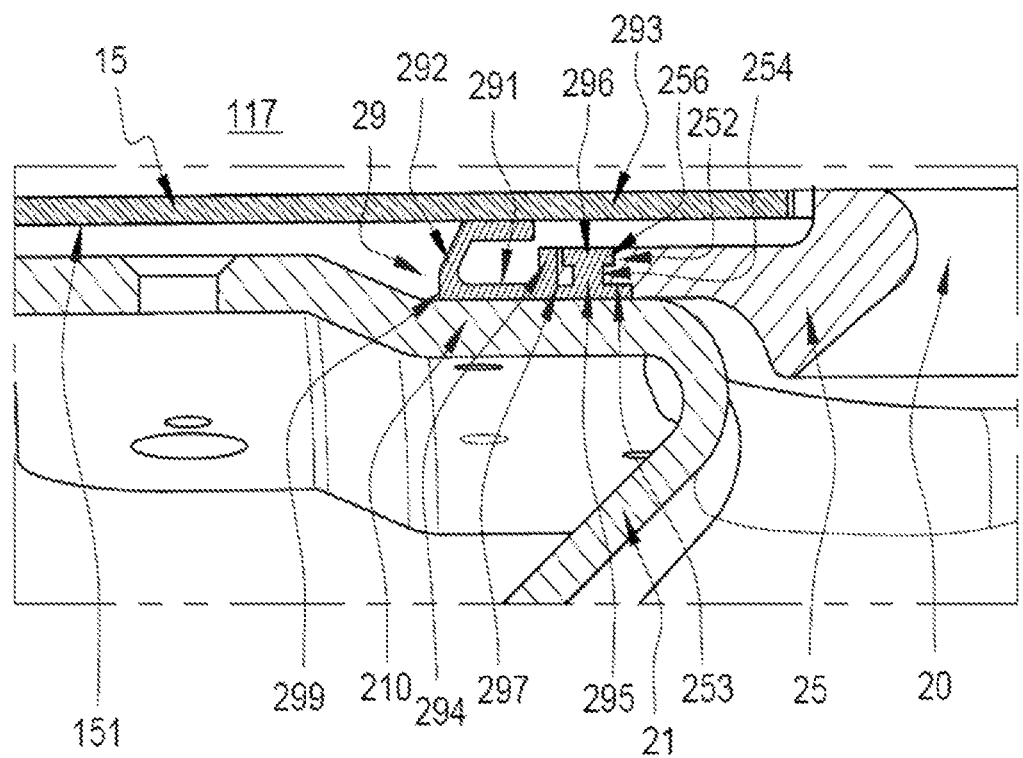

SEAL FOR AN INTERMEDIATE TURBOMACHINE CASING

CROSS-REFERENCE TO RELATED APPLICATIONS

This application is the U.S. National Stage of PCT/FR2020/051156, filed Jul. 2, 2020, which in turn claims priority to French patent application number 1907892 filed Jul. 12, 2019. The content of these applications are incorporated herein by reference in their entireties.

TECHNICAL FIELD OF THE INVENTION

The technical field of the invention is that of turbomachines.

The present invention more particularly pertains to a seal making it possible to ensure the sealing between a discharge duct and an outer annular shroud of a turbomachine intermediate casing. The invention also pertains to an intermediate casing discharge grille comprising such a seal.

TECHNOLOGICAL BACKGROUND OF THE INVENTION

A bypass turbomachine comprises, from upstream to downstream in the direction of gas flow, a fan, a primary flow annular space and a secondary flow annular space. The mass of air sucked up by the fan is divided into a primary flow, which circulates in the primary flow space, and into a secondary flow, which is concentric with the primary flow and which circulates in the secondary flow space. The primary flow annular space traverses a primary body comprising one or more compressor stages, notably a low pressure compressor and a high pressure compressor, a combustion chamber, one or more turbine stages, notably a high pressure turbine and a low pressure turbine, and a gas exhaust nozzle.

The turbomachine also comprises an intermediate casing of which the hub is arranged between the casing of the low pressure compressor and the casing of the high pressure compressor. The hub of the intermediate casing comprises two coaxial annular shrouds: an inner annular shroud delimiting the primary flow space of the primary flow and an outer annular shroud delimiting the secondary annular flow space of the secondary flow.

The intermediate casing also comprises discharge valves regularly spread out around the longitudinal axis of the turbomachine. The discharge valves make it possible to regulate the inlet flow rate of the high pressure compressor in order notably to limit risks of pumping of the low pressure compressor by evacuating a part of the primary flow into the annular flow space of the secondary flow in certain operating conditions. To do so, each discharge valve comprises a gate pivotably mounted around an axis, so as to be angularly displaceable with respect to the intermediate casing, between a closing position in which the gates closes an air inlet orifice provided in the inner annular shroud and a position of opening of this orifice enabling the evacuation of a part of the primary air flow.

The discharge valves also comprise a discharge duct which ensures the discharge of a part of the primary flow into the secondary flow. The discharge ducts extend between the inner annular shroud and the outer annular shroud and emerge in the primary flow space through the air inlet orifice formed in the inner annular shroud, and in the secondary flow space, through an outlet orifice formed in the outer annular shroud. Further, discharge grilles, comprising fins, are fastened at the level of the outlet orifices formed in the outer annular shroud in order to guide the primary flow during its injection into the secondary flow and to prevent debris being introduced into the primary flow through the discharge ducts.

In so far as the discharge valves are situated in a fire risk zone, air tight and fire proof seals are placed at the ends of the discharge ducts, notably at the level of the junction between the discharge duct and the outer annular shroud, in order to prevent any fire present in this zone being supplied with air or prevent it propagating into the secondary flow space.

It is known to use seals provided with studs to ensure the maintaining in position of the seals on the ends of the discharge ducts.

However, the mounting of such seals is constraining and long to carry out. In addition, the studs are frequently damaged when the seals are put in place such that the bearing of the seal against the discharge duct and thus its compression may be insufficient. Furthermore, in certain cases of operation such as pumping pressurisation of the discharge duct, the seal can be displaced and thus can no longer ensure the sealing in an optimal manner.

Another solution used for putting in place and maintaining the seal in position consists in directly bonding the seal on the discharge duct.

However, this solution comprises numerous drawbacks, notably on account of the tooling required to position the seal to bond, the drying time of the adhesive, the generation of operational problems in maintenance during failure of the discharge duct or of the seal.

Furthermore, another problem relates to the dynamic behaviour of discharge grilles. Indeed, the response of certain eigenmodes of the discharge grilles generates consequent dynamic stresses.

SUMMARY OF THE INVENTION

In this context, the invention aims to propose a solution making it possible to resolve these drawbacks.

Thus, a first aspect of the invention relates to a seal for ensuring the sealing between a first turbomachine member, such as a discharge duct of an intermediate casing, and a second member of the turbomachine, such as an outer annular shroud of an intermediate casing, and configured to surround a third turbomachine member, such as a discharge grille of the intermediate casing.

The seal according to the first aspect, has a U-shaped cross section and comprises:
  a base plate intended to bear against the first member,
  a sealing lip intended to bear against the second member through deformation of said sealing lip to ensure air tightness and fire proofing through contact,
  attachment means intended to be hooked onto the third member.

The seal according to the first aspect of the invention makes it possible to resolve one or more of the drawbacks of the prior art cited previously.

The assembly and dismantling of the seal according to the invention are simplified and faster. Indeed, to put the seal in position, it suffices to mount the base plate against the first member and to hook the attachment means onto the third member. Next, it suffices to fix the second member on the first member which ensures the compression of the sealing lip against said members and the maintaining in position of the seal.

In order to facilitate the mounting of the seal, the latter may be hooked onto the third member then be mounted between the first member and the second member, at the same time as the third member.

Further, the fact of mounting the attachment means on the third member makes it possible to dampen the eigenmodes of the third member.

Apart from the characteristics that have been mentioned in the preceding paragraph, the seal according to the first aspect of the invention may have one or more complementary characteristics among the following, considered individually or according to all technically possible combinations thereof.

According to a non-limiting embodiment, the attachment means have an inverted U-shaped cross section and comprise:
- a lower arm extending into the continuation of the base plate,
- an upper arm substantially parallel to the lower arm,
- a base connecting the lower arm to the upper arm, the base, the lower arm and the upper arm forming a housing configured to receive a peripheral edge of the third member.

According to a non-limiting embodiment, the attachment means have an inverted U-shaped cross section and comprise:
- a lower arm extending into the continuation of the base plate, the lower arm comprising at least one through opening configured to receive a slug,
- an upper arm substantially parallel to the lower arm,
- a base connecting the lower arm to the upper arm, the base, the lower arm and the upper arm forming a housing configured to receive a peripheral edge of the third member.

According to a non-limiting embodiment, the attachment means have an inverted L shaped cross section and comprise:
- a lower arm extending into the continuation of the base plate,
- a base projecting from the lower arm, the lower arm forming, with the base, a shoulder configured to receive a peripheral edge of the third member.

According to a non-limiting embodiment, the attachment means have an inverted L shaped cross section and comprise:
- a lower arm extending into the continuation of the base plate,
- a base projecting from the lower arm, the lower arm forming, with the base, a shoulder configured to receive a peripheral edge of the third member,
- at least one protuberance extending from the lower arm, parallel to the base, configured to cooperate with at least one boring provided at the level of the peripheral edge of the third member.

According to a non-limiting embodiment, the seal comprises bonding means to ensure the seal is maintained on the third member.

A second aspect of the invention relates to a discharge grille of an intermediate casing of a turbomachine, comprising a peripheral edge and a seal according to the first aspect, mounted on said peripheral edge via the attachment means.

Apart from the characteristics that have been mentioned in the preceding paragraph, the discharge grille according to the second aspect of the invention may have one or more complementary characteristics among the following, considered individually or according to all technically possible combinations thereof.

According to a non-limiting embodiment,
the attachment means of the seal have an inverted U-shaped cross section and comprise:
- a lower arm extending into the continuation of the base plate,
- an upper arm substantially parallel to the lower arm,
- a base connecting the lower arm to the upper arm, the base, the lower arm and the upper arm forming a housing for receiving the peripheral edge of the discharge grille, the peripheral edge comprises a flat spot provided in a lower part of said peripheral edge, to abut against the lower arm of the attachment means.

According to a non-limiting embodiment,
the peripheral edge comprises:
- at least one boring and,
- a flat spot provided in a lower part of said peripheral edge, the attachment means have an inverted U-shaped cross section and comprise:
- a lower arm extending into the continuation of the base plate and comprising at least one through opening suited to be arranged facing said at least one boring,
- an upper arm substantially parallel to the lower arm,
- a base connecting the lower arm to the upper arm, the base, the lower arm and the upper arm forming a housing suited to receive the peripheral edge of the discharge grille such that the flat spot abuts against the lower arm of the attachment means,
- at least one slug suited to traverse said at least one boring provided in the peripheral edge and said at least one through opening provided in the lower arm and to abut against the upper arm.

According to a non-limiting embodiment,
the peripheral edge comprises a flat spot provided in a lower part of said peripheral edge,
the attachment means have an inverted L shaped cross section and comprise:
- a lower arm extending into the continuation of the base plate,
- a base projecting from the lower arm, the lower arm forming, with the base, a shoulder suited to receive the peripheral edge of the discharge grille such that the flat spot abuts against the lower arm of the attachment means.

According to a non-limiting embodiment,
The peripheral edge comprises:
- at least one boring,
- a flat spot provided in a lower part of said peripheral edge, the attachment means have an inverted L shaped cross section and comprise:
- a lower arm extending into the continuation of the base plate,
- a base projecting from the lower arm, the lower arm forming, with the base, a bearing shoulder suited to receive a peripheral edge of the third member,
- at least one protuberance extending, from the lower arm, parallel to the base, suited to be introduced into said at least one boring provided in the discharge grille.

A third aspect of the invention relates to an intermediate casing of a bypass turbomachine, comprising:
an inner annular shroud configured to delimit a primary flow space of a primary gas flow of the turbomachine, an outer annular shroud configured to delimit a secondary flow space of a secondary gas flow of the turbomachine, a discharge duct, extending between the inner annular shroud and the outer annular shroud, said discharge duct emerging on the one hand in the primary flow space through an inlet orifice formed in the inner annular shroud, and on the other hand in the secondary flow space through an outlet orifice formed in the outer annular shroud, a discharge grille fastened to the discharge duct, at the level of the outlet orifice of the outer annular shroud, a seal according to the first aspect of the invention, arranged around the discharge grille, between the outer annular shroud and the discharge duct such that the base plate of the seal bears against the discharge duct, the sealing lip bears against the outer annular shroud and that the attachment means are mounted on a peripheral edge of the discharge grille.

Finally, the invention according to a fourth aspect pertains to a turbomachine comprising a low pressure compressor, a high pressure compressor and an intermediate casing according to the third aspect, positioned longitudinally between the low pressure compressor and the high pressure compressor.

BRIEF DESCRIPTION OF THE FIGURES

Other characteristics and advantages of the invention will become clear on reading the description that follows, with reference to the appended figures, which illustrate:

FIG. 1 schematically illustrates, in axial section, a bypass turbomachine according to the invention;

FIG. 2 illustrates an axial sectional view of a part of a hub of an intermediate casing of a turbomachine comprising a discharge duct, FIG. 3a illustrates a first axial sectional view of a part of a seal according to a first embodiment of the invention, arranged between an outer annular shroud and a discharge duct, FIG. 3b illustrates a second axial sectional view of the seal illustrated in FIG. 3a, FIG. 4a illustrates a first axial sectional view of a part of a seal according to a second embodiment of the invention, arranged between an outer annular shroud and a discharge duct, FIG. 4b illustrates a second axial sectional view of a part of a seal illustrated in FIG. 4a, FIG. 5a illustrates a first axial sectional view of a part of a seal according to a third embodiment of the invention, arranged between an outer annular shroud and a discharge duct, FIG. 5b illustrates a second axial sectional view of the seal illustrated in FIG. 5a, FIG. 6a illustrates a first axial sectional view of a part of a seal according to a fourth embodiment of the invention, arranged between an outer annular shroud and a discharge duct, FIG. 6b illustrates a second axial sectional view of the seal illustrated in FIG. 6a.

DETAILED DESCRIPTION

The figures are presented for indicative purposes and in no way limit the invention.

Unless stated otherwise, a same element appearing in the different figures has a single reference.

[FIG. 1] schematically illustrates, in axial section, a bypass turbomachine.

Such a turbomachine 100 comprises, from upstream to downstream along the direction of gas flow, a fan 111, a low pressure compressor 112, a high pressure compressor 114, a combustion chamber 116, a high pressure turbine 118 and a low pressure turbine 120. The high pressure turbine 118 is integral with the high pressure compressor 114 so as to form a high pressure body, whereas the low pressure turbine 120 is integral with the low pressure compressor 112 so as to form a low pressure body, such that each turbine rotationally drives the compressor around the axis X-X of the turbomachine 100 under the effect of the thrust of the gases coming from the combustion chamber 116.

The mass of air sucked up by the fan 111 is divided into a primary flow F1, which circulates in a primary flow space 115, and into a secondary flow F2, which is concentric with the primary flow F1 and circulates in the secondary flow space 117.

Further, in such a turbomachine 100, a hub of the intermediate casing 12 is interposed between the low pressure compressor 112, situated upstream, and the high pressure compressor 114, situated downstream.

In the remainder of the description, the terms "upper" and "lower" designate a part or a surface, respectively, far away or close to the axis of rotation of the turbomachine 100.

[FIG. 2] illustrates an axial sectional view of a part of the hub of the intermediate casing 12 of the turbomachine 100.

With reference to FIG. 2, the hub 13 of the intermediate casing 12 comprises two coaxial annual shrouds, respectively inner 14 and outer 15, mutually connected by an upstream transversal flange 16 and by a downstream transversal flange 17. The upstream flange 16 is arranged downstream of the low pressure compressor 112 whereas the downstream flange 17 is arranged upstream of the high pressure compressor 114.

The inner shroud 14 delimits the primary flow annular space 115 of the primary flow F1 of the turbomachine 100 and comprises air inlet orifices 18 spread out circumferentially around the axis X-X of the turbomachine 100. The air inlet orifices 18 are closed by a corresponding discharge valve 19 intended for the regulation of the flow rate of the high pressure compressor 114.

Such a discharge valve 19 may take the form of a gate which is pivotably mounted on the inner shroud 14 between a position of closure, in which the gate shuts the air inlet orifice 18 and an opening position, in which the gate projects radially inwards with respect to the inner shroud 14 and thus enables the withdrawal of a part of the primary flow F1 in the primary flow space 115.

The outer shroud 15 delimits for its part the secondary flow space 117 of the secondary flow F2 of the turbomachine, and comprises air outlet orifices 20 arranged downstream of the downstream transversal flange 17 and spread out circumferentially around the axis X-X of the turbomachine 100.

When the flow rate of air being able to enter into the high pressure compressor is reduced, a surplus of air in the secondary flow space 14 may then be evacuated through these outlet orifices 20, thus avoiding pumping phenomena able to lead to a deterioration or even a complete destruction of the low pressure compressor 112.

The turbomachine 100 comprises, further, discharge streams formed between the air inlet orifices 19 and outlet orifices 20. Each discharge stream is delimited, from upstream to downstream between an associated inlet orifice 18 and an outlet orifice 20, by an annular intermediate space 22, delimited by the inner shrouds 14, 15 and the transversal flanges 16, 17, then by a discharge duct 21, configured to guide the air flow to the secondary flow space 117. The discharge duct 21 thus comprises an intermediate orifice 23, which emerges in the intermediate space 22 at the level of the upstream surface of the downstream transversal flange 17.

In addition, discharge grilles 25, comprising fins 251, are fastened, by means of fastening screws, to the discharge ducts 21, at the level of the outlet orifices 20 of the outer annular shroud 15. The discharge grilles 25 ensure the guiding of the primary flow F1 during its injection into the secondary flow F2, along a direction substantially parallel to that of the secondary flow F2 and in order to prevent debris from being introduced into the primary flow F1 through the discharge ducts 21.

In addition, a seal 26, 27, 28, 29 according to the invention, air tight and fire proof, for example made of elastomer, is housed at the level of the junction between the discharge duct 21 and the outer annular shroud 15, so as to surround the discharge grille 25.

Advantageously, the seal 26, 27, 28, 29 has a shape suited to that of the outlet orifice 20 provided in the outer annular shroud 15. Thus, the seal 26, 27, 28, 29 has for example a rectangular, square or instead circular shape.

The seal 26, 27, 28, 29 according to the invention has a U-shaped cross section and comprises:
- a base plate 261, 271, 281, 291 bearing against the discharge duct 21,
- a sealing lip 262, 272, 282, 292 bearing against the outer annular shroud 15,
- attachment means 263, 273, 283, 293 hooked onto the discharge grille 25.

[FIG. 3a] illustrates a first axial sectional view of a part of a seal 26 according to a first embodiment of the invention.

[FIG. 3b] illustrates a second axial sectional view of the seal 26 illustrated in FIG. 3a.

With reference to FIGS. 3a and 3b, the seal 26 comprises a base plate 261 that bears against a rim 210 of the discharge duct 21. Advantageously, the base plate 261 has a convex lower surface.

In the continuity of the base plate 261, the seal 26 comprises a sealing lip 262 which ensures the sealing between the discharge duct 21 and the inner annular shroud 15 by a controlled deformation of the sealing lip 262.

As may be seen in FIGS. 3a and 3b, the portion of the seal 26 comprising the base plate 261 and the sealing lip 262 has a C-shaped cross-section. Indeed, the sealing lip 262 extends longitudinally in the direction of the outer annular shroud 15, such that the seal 26 forms a first curvature 269 at the level of the junction between the base plate 261 and the sealing lip 262. Further, the seal 26 comprises a second curvature formed by the deformation of the sealing lip 262 which is compressed by the outer annular shroud 15. The compression of the sealing lip 262 by the outer annular shroud 15 makes it possible to prevent air and fire infiltrating between the outer annular shroud 15 and the discharge duct 21.

Furthermore, the seal 26 comprises attachment means 263 of inverted U-shaped cross section. In particular, in this first embodiment, the attachment means 263 comprise a base 264, a lower arm 265 and an upper arm 266 which form a housing making it possible to receive the peripheral edge 252 of the evacuation grille 25.

Thanks to the housing formed by the attachment means 263, the eigenmodes of the discharge grille 25 are dampened. Further, given the flexibility of the seal 26, the arms 265, 266 may be manually hooked onto the peripheral edge 252 of the discharge grille 25 before the mounting of the discharge grille 25 on the discharge duct 21. The maintaining in position of the seal 26 on the discharge duct 21 is ensured by the fastening of the discharge grille 25 on the rim 210 of the discharge duct 21, for example by means of fastening screws. Thus, to dismantle the seal 26, it suffices to unscrew the discharge grille 25 from the discharge duct 21 then to unhook the seal 26.

The discharge grille 25 comprises, further, a flat spot 252 provided in a lower part of its peripheral edge 252 which abuts against the lower arm 265 of the attachment means 263. The flat spot 252 thus makes it possible to control the compression of the base plate 261 of the seal 26 during the fastening of the discharge grille 20 on the rim 210 of the discharge duct 21, and thus to avoid creep or degradation of the seal 26.

Advantageously, the seal 26 comprises bonding means making it possible to ensure the maintaining of the seal 26 on the peripheral edge 252 of the discharge grille 25. The bonding means are for example formed by a chemical agent or by a film bonded onto the contact surface between the seal 26 and the peripheral edge 252 of the discharge grille 25.

[FIG. 4a] illustrates a first axial sectional view of a part of a seal 27 according to a second embodiment of the invention.

[FIG. 4b] illustrates a second axial sectional view of the seal 27 illustrated in FIG. 4a.

With reference to FIGS. 4a and 4b, the seal 27 comprises a base plate 271 and a sealing lip 272 that are identical, respectively, to the base plate 261 and to the sealing lip 262 of the seal 26 according to the first embodiment.

Further, the attachment means 273 are also of inverted U-shaped cross section and comprise a base 274, a lower arm 275 and an upper arm 276 which form a housing making it possible to receive the peripheral edge 252 of the evacuation grille 25. Thus, the attachment means 273 may be manually hooked onto the peripheral edge 252 of the discharge grille 25. Thanks to the housing formed by the attachment means 273 of the seal 27, the eigenmodes of the discharge grille 25 are dampened. Advantageously, the seal 27 also comprises bonding means making it possible to ensure the maintaining of the seal 27 on the peripheral edge 252 of the discharge grille 25.

However, unlike the seal 26 according to the first embodiment, the lower arm 275 of the attachment means 273 comprises a plurality of through openings 278. These through openings 278 are arranged facing borings 254 provided in the peripheral edge 252 so as to receive slugs 255 which traverse the through openings 278 and the borings 254. In particular, each slug 255, for example made of aluminium, comprises a head arranged bearing against the rim 210 of the discharge duct 21 and a rod that traverses the boring 254 and the through opening 278 until abutting against the upper arm 276 so as to limit the crushing of the seal 26. The slugs 255 thus make it possible to control the compression of the seal 26 during the fastening of the discharge grille 25 on the discharge duct 21. Further, the use of slugs 255 makes it possible to decrease the thickness of the peripheral edge 252 of the discharge grille and thus to reduce the mass of the discharge grille 25. Further, this makes it possible to facilitate its integration in an often restricted environment.

[FIG. 5a] illustrates a first axial sectional view of a part of a seal 28 according to a third embodiment of the invention.

[FIG. 5b] illustrates a second axial sectional view of the seal 28 illustrated in FIG. 5a.

With reference to FIGS. 5a and 5b, the seal 28 comprises a base plate 281 and a sealing lip 282 that are identical, respectively, to the base plates 261, 271 and to the sealing lips 262, 272 of the seals 26, 27 described previously.

Furthermore, unlike the seals 26, 27, the attachment means 283 have an inverted L shaped cross section. In particular, the attachment means 283 comprise a lower arm 285 which is in the continuity of the base plate 281, bearing against a rim 210 of the discharge duct 21 and a base 284 projecting from the lower arm 285. The lower arm 285 forms, with the base 284, a shoulder 287 suited to receive the peripheral edge 252 of the third member 25. Thus, the peripheral edge 252 abuts against the shoulder 287 which makes it possible to dampen the eigenmodes of the discharge grille 25. Advantageously, the seal 28 comprises bonding means making it possible to ensure the maintaining of the seal 28 on the peripheral edge 252 of the discharge grille 25.

Further, in this embodiment, the discharge grille 25 also comprises a flat spot 252 provided in a lower part of its peripheral edge 252 which abuts against the lower arm 285 of the attachment means 283. Thus, the flat spot 252 makes it possible to control the compression of the base plate 281 of the seal 28 during the fastening of the discharge grille 20 on the rim 210 of the discharge duct 21, and thus to avoid creep or degradation of the seal 28.

[FIG. 6a] illustrates a first axial sectional view of a part of a seal 29 according to a third embodiment of the invention.

[FIG. 6b] illustrates a second axial sectional view of the seal 29 illustrated in FIG. 6a.

With reference to FIGS. 6a and 6b, the seal 29 comprises a base plate 291 and a sealing lip 292 that are identical, respectively, to the base plates 261, 271, 281 and to the sealing lips 262, 272, 282 of the seals 26, 27, 28 described previously.

In the same way as the seal 28 according to the third embodiment, the attachment means 293 have an inverted L shaped cross section. Further, the attachment means 293 comprise a lower arm 295 in the continuation of the base plate 291 and a base 294 projecting from the lower arm 295. The lower arm 295 forms, with the base 294, a shoulder 297 suited to receive the peripheral edge 252 of the third member 25. Thus, the peripheral edge 252 abuts against the shoulder 297 which makes it possible to dampen the eigenmodes of the discharge grille 25. Advantageously, the seal 29 comprises bonding means making it possible to ensure the maintaining of the seal 29 on the peripheral edge 252 of the discharge grille 25.

Further, unlike the seal 28 according to the third embodiment, the attachment means 293 comprise a plurality of protuberances 296 which extend from the lower arm 295 of the attachment means 293, along an axis parallel to the axis along which extends the base 294. Each protuberance 296 comprises a rod which extends from the lower arm 295 and a head arranged at the end of the rod. The mounting of the attachment means 293 on the discharge grille 25 is then carried out by inserting the protuberances 296 into borings 256 provided in the peripheral edge 252, of complementary shape to the protuberances 296. The use of protuberances 296 makes it possible to decrease the thickness of the peripheral edge 252 of the discharge grille 25 and thus to reduce the mass of the discharge grille 25. Further, in so far as the protuberances 296 form part of the geometry of the seal, the assembly with the discharge grille 25 is simplified.

In this embodiment, the discharge grille 25 also comprises a flat spot 252 provided in a lower part of its peripheral edge 252 which abuts against the lower arm 295 of the attachment means 293 so as to control the compression of the base plate 291 of the seal 29 during the fastening of the discharge grille 20 on the rim 210 of the discharge duct 21, and thus avoid creep or degradation of the seal 29.

The embodiments described above are in no way limiting, and modifications may be made thereto without going beyond the scope of the invention.

The invention claimed is:

1. A discharge grille of an intermediate casing of a turbomachine, comprising a peripheral edge and a seal mounted on said peripheral edge via an attachment system, the seal ensuring a sealing between a first turbomachine member and a second member of the turbomachine, and surrounding the discharge grille of the intermediate casing, said seal having a U-shaped cross section and comprises:
   a. a base plate configured to bear against the first member, and
   b. a sealing lip configured to bear against the second member through deformation of said sealing lip to ensure air tightness and fire proofing through contact.

2. The discharge grille of an intermediate casing of a turbomachine according to claim 1, wherein the attachment system has an inverted U-shaped cross section and comprises:
   a. a lower arm extending into the continuation of the base plate,
   b. an upper arm substantially parallel to the lower arm,
   c. a base connecting the lower arm to the upper arm, the base, the lower arm and the upper arm forming a housing configured to receive a peripheral edge of the third member.

3. The discharge grille of an intermediate casing of a turbomachine according to claim 1, wherein the attachment system has an inverted U-shaped cross section and comprises:
   a. a lower arm extending into the continuation of the base plate, the lower arm comprising at least one through opening configured to receive a slug,
   b. an upper arm substantially parallel to the lower arm, and
   c. a base connecting the lower arm to the upper arm, the base, the lower arm and the upper arm forming a housing configured to receive a peripheral edge of the third member.

4. The discharge grille of an intermediate casing of a turbomachine according to claim 1, wherein the attachment system has an inverted L shaped cross section and comprises:
   a. a lower arm extending into the continuation of the base plate, and
   b. a base arranged projecting from the lower arm, the lower arm forming, with the base, a shoulder configured to receive a peripheral edge of the third member.

5. The discharge grille of an intermediate casing of a turbomachine according to claim 1, wherein the attachment system has an inverted L shaped cross section and comprises:
   a. a lower arm extending into the continuation of the base plate,
   b. a base arranged projecting from the lower arm, the lower arm forming, with the base, a shoulder configured to receive a peripheral edge of the third member, and c. at least one protuberance extending from the lower arm, parallel to the base, configured to cooperate with at least one boring provided at the level of the peripheral edge of the third member.

6. The discharge grille of an intermediate casing of a turbomachine according to claim 1, wherein the seal comprises bonding means to ensure the maintaining of the seal on the third member.

7. The discharge grille of an intermediate casing of a turbomachine according to claim 1, wherein:
   a. the attachment system of the seal has an inverted U-shaped cross section and comprises:
      i. a lower arm extending into the continuation of the base plate,
      ii. an upper arm substantially parallel to the lower arm, and
      iii. a base connecting the lower arm to the upper arm, the base, the lower arm and the upper arm forming a housing for receiving the peripheral edge of the discharge grille,
   b. the peripheral edge comprises a flat spot provided in a lower part of said peripheral edge, to abut against the lower arm of the attachment system.

8. The discharge grille of an intermediate casing of a turbomachine according to claim 1, wherein:
   a. the peripheral edge comprises:
      i. at least one boring and,
      ii. a flat spot provided in a lower part of said peripheral edge,
   b. the attachment system has an inverted U-shaped cross section and comprises:
      i. a lower arm extending into the continuation of the base plate and comprising at least one through opening configured to be arranged facing said at least one boring,
      ii. an upper arm substantially parallel to the lower arm,
      iii. a base connecting the lower arm to the upper arm; the base, the lower arm and the upper arm forming a housing configured to receive the peripheral edge of the discharge grille such that the flat spot abuts against the lower arm of the attachment system, and
      iv. at least one slug configured to traverse said at least one boring provided in the peripheral edge and said at least one through opening provided in the lower arm and to abut against the upper arm.

9. The discharge grille of an intermediate casing of a turbomachine according to claim 1, wherein:
   a. the peripheral edge comprising a flat spot provided in a lower part of said peripheral edge,
   b. the attachment system has an inverted L shaped cross section and comprises:
      i. a lower arm extending into the continuation of the base plate,
      ii. a base projecting from the lower arm, and
      iii. the lower arm forming, with the base, a shoulder configured to receive the peripheral edge of the discharge grille such that the flat spot abuts against the lower arm of the attachment system.

10. The discharge grille of an intermediate casing of a turbomachine according to claim 1, wherein:
    a. the peripheral edge comprises:
    b. at least one boring,
    c. a flat spot provided in a lower part of said peripheral edge,
    d. the attachment system has an inverted L shaped cross section and comprises:
       i. a lower arm extending into the continuation of the base plate,
       ii. a base projecting from the lower arm, the lower arm forming, with the base, a bearing shoulder suited to receive a peripheral edge of the third member, and
       iii. at least one protuberance extending from the lower arm parallel to the base, configured to be introduced into said at least one boring provided in the discharge grille.

11. An intermediate casing of a bypass turbomachine, comprising:
    a. an inner annular shroud configured to delimit a primary flow space of a primary gas flow of the turbomachine,
    b. an outer annular shroud configured to delimit a secondary flow space of a secondary gas flow of the turbomachine,
    c. a discharge duct, extending between the inner annular shroud and the outer annular shroud, said discharge duct emerging on the one hand in the primary flow space through an inlet orifice formed in the inner annular shroud, and on the other hand in the secondary flow space through an outlet orifice formed in the outer annular shroud,
    d. a discharge grille according to claim 1, fastened to the discharge duct, at a level of the outlet orifice of the outer annular shroud,
    e. the seal arranged around the discharge grille, between the outer annular shroud and the discharge duct such that the base plate of the seal bears against the discharge duct, the sealing lip bears against the outer annular shroud and that the attachment system is hooked onto a peripheral edge of the discharge grille.

12. A turbomachine comprising a low pressure compressor, a high pressure compressor and an intermediate casing according to claim 11, positioned longitudinally between the low pressure compressor and the high pressure compressor.

13. The discharge grille according to claim 1, wherein the first turbomachine member is a discharge duct of an intermediate casing and the second member of the turbomachine is an outer annular shroud of an intermediate casing.

* * * * *